(12) United States Patent
McAllister et al.

(10) Patent No.: US 6,483,105 B2
(45) Date of Patent: Nov. 19, 2002

(54) OPTICALLY CONTROLLED ACTUATOR

(75) Inventors: Douglas J. McAllister, Tulsa, OK (US); Giuseppe D. Cosa, Broken Arrow, OK (US)

(73) Assignee: Realtime Automation, Inc., Tulsa, OK (US)

( * ) Notice: Subject to any disclaimer, the term of this patent is extended or adjusted under 35 U.S.C. 154(b) by 0 days.

(21) Appl. No.: 09/790,960

(22) Filed: Feb. 22, 2001

(65) Prior Publication Data

US 2002/0113201 A1 Aug. 22, 2002

(51) Int. Cl.[7] ................................................. G01D 5/34
(52) U.S. Cl. .................. 250/231.13; 341/13; 417/199.1
(58) Field of Search ............................. 250/231.13–18; 341/13, 31; 417/199.1, 201, 203, 205, 247, 423.4, 266, 410.4, 244, 313

(56) References Cited

U.S. PATENT DOCUMENTS

| | | | | |
|---|---|---|---|---|
| 3,963,919 A | | 6/1976 | Sells | |
| 4,118,129 A | * | 10/1978 | Grundherr | ............... 400/144.2 |
| 4,446,367 A | | 5/1984 | Babsch et al. | |
| 4,634,859 A | | 1/1987 | Mortell | |
| 4,804,944 A | * | 2/1989 | Golladay et al. | ........... 340/624 |
| 4,968,882 A | * | 11/1990 | Tzeng et al. | ........... 250/231.14 |
| 5,541,406 A | | 7/1996 | Waynik et al. | |
| 5,698,849 A | | 12/1997 | Figueria, Jr. | |
| 5,708,496 A | * | 1/1998 | Barnett et al. | ................. 356/28 |

OTHER PUBLICATIONS

Wehber, "Vilter Single Screw Compressors—Design and Operation," published more than one year ago, 4 pages.
Vilter, "Single Screw Compressor Units," 1997, 12 pages.

* cited by examiner

Primary Examiner—Kevin Pyo
Assistant Examiner—Seung C. Sohn
(74) Attorney, Agent, or Firm—Francis L. Conte

(57) ABSTRACT

A rotary actuator includes a motor operatively joined to a gear train having an output shaft. An optical encoder is operatively joined to the shaft of the motor for detecting rotation thereof. A controller is operatively joined to the encoder, and is configured for operating the motor to drive the output shaft between minimum and maximum rotary positions as detected by the encoder.

20 Claims, 3 Drawing Sheets

OPTICALLY CONTROLLED ACTUATOR

BACKGROUND OF THE INVENTION

The present invention relates generally to screw compressors, and, more specifically, to rotary actuators therefor.

A screw compressor has advantages in compressing gases in various applications such as gas production and distribution, landfill gas, fuel gas boosters, and refrigeration systems. All of these applications are subject to various degrees of hostile environment in which the compressors must operate with precision and reliability.

A typical single screw compressor includes a cylindrical main screw with helical grooves therein which cooperate with a pair of flat star shaped gate rotors that mesh therewith. The helically fluted screw is driven by a motor during operation, and gas is compressed along each helical groove as a corresponding tooth of the gate rotor travels therealong.

The two gate rotors are disposed on opposite sides of the main screw for compressing the gas simultaneously in two flowpaths. Capacity and volume ratio may be separately controlled in each flowpath of the screw pump using corresponding slide valves. The slide valves in turn are driven by corresponding rack-and-pinion gearboxes which convert rotary motion at the pinion to axial translation of the rack which drives the corresponding slide valves.

The pinion, in turn, for each control valve is driven by a rotary actuator. The rotary actuator includes an electrical motor driving a reduction gearbox having an outlet shaft coupled to the pinion. An electrical controller for the screw compressor controls operation of the individual rotary actuators for positioning the corresponding slide valves between minimum and maximum slide positions as operation requires.

Precise control of the slide valves requires precise control of the rotary actuators. The actuator motors typically operate at constant speed, with corresponding minimum and maximum rotary positions of the output shafts. Shaft feedback position is normally obtained using a conventional rotary potentiometer which varies in electrical resistance as its rotor is turned. The measured resistance of the potentiometer may be calibrated against the rotary position of the actuator output shaft in a relatively complex procedure.

More specifically, normal rotary potentiometers have a maximum rotary range of about 270 degrees, whereas the required rotary range of the actuator output shaft is typically greater than 270 degrees. Accordingly, a reduction gearset must be used to operatively join the potentiometer to the actuator output shaft, and correspondingly calibrated to ensure that the rotary range of the potentiometer matches the rotary range of the output shaft. Such actuators with rotary potentiometers and cooperating gear sets have been in public use in the U.S. for many years, and commercially available from several sources, such as El-O-Matic International, Hackensack, N.J., for example.

Since the typical environment of the screw compressor is hostile and is subject to heat, vibration, and oil, potentiometers are unreliable and experience a high failure rate.

Accordingly, it is desired to provide an improved rotary actuator for use with screw compressors, as well as for other applications requiring precise control of rotary position.

BRIEF SUMMARY OF THE INVENTION

A rotary actuator includes a motor operatively joined to a gear train having an output shaft. An optical encoder is operatively joined to the shaft of the motor for detecting rotation thereof. A controller is operatively joined to the encoder, and is configured for operating the motor to drive the output shaft between minimum and maximum rotary positions as detected by the encoder.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
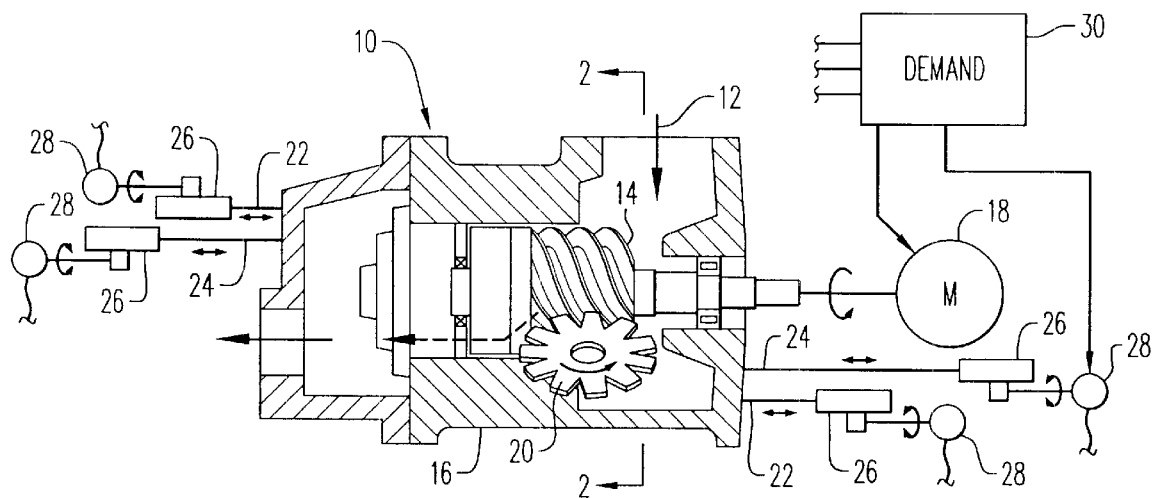
FIG. 1 is a partly sectional, side elevational view of an exemplary screw compressor and control valves illustrated schematically in accordance with a preferred embodiment of the present invention.

Illustrated in FIG. 1 is a screw compressor 10 which may have any conventional form for compressing any desired gas 12. The compressor includes a helically fluted screw 14 suitably mounted in a housing 16 and rotated during operation by a motor 18 of any suitable electrical or other fuel-driven form.

Figure 2:
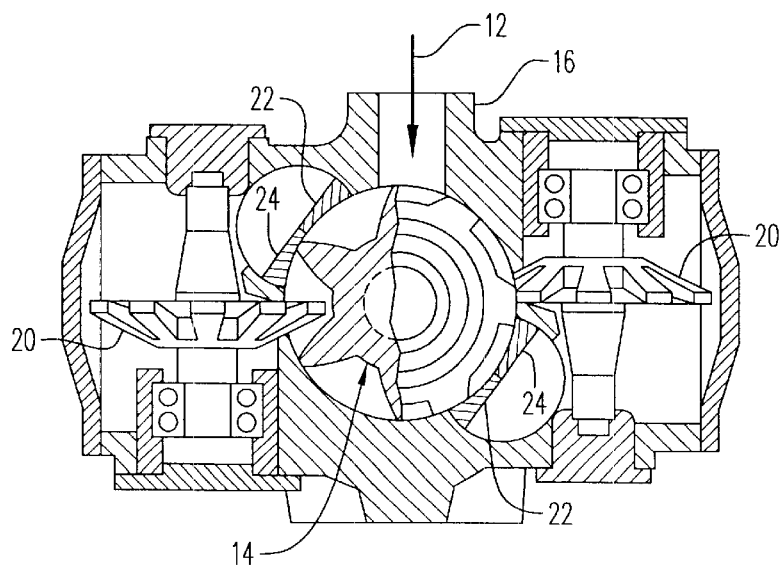
FIG. 2 is a partly sectional elevational view of the compressor illustrated in FIG. 1 and taken along line 2—2.

As illustrated in FIGS. 1 and 2, the screw 14 includes helical grooves which cooperate with a pair of gate rotors 20 suitably mounted on diametrically opposite sides of the screw. The gate rotors have a generally flat star shape with corresponding teeth which engage corresponding grooves of the screw and rotate for compressing the gas 12 along the lengths of the helical grooves as the screw is driven during operation. The gas 12 enters a suction inlet in the housing at one end of the screw 14, is compressed along the length of the screw as it rotates, and is discharged under pressure at an opposite end of the screw through a corresponding outlet in the housing.

As initially shown in FIG. 2, the gas 12 may be compressed into parallel and simultaneous paths through the compressor in cooperation with the corresponding gate rotors. Associated with each gate rotor is a capacity control slide valve 22 and an adjoining volume ratio control slide valve 24 which cooperate with the screw in a conventional manner.

In order to control translation of the two sets of slide valves 22,24, each of those valves is suitably joined to a conventional rack-and pinion gearbox 26 shown in FIG. 1 which converts rotation of the pinion therein to axial translation of the rack thereof which axially drives the slide valves for insertion and withdrawal in the housing of the compressor as required for normal operation.

In accordance with the present invention, corresponding rotary actuators 28 are operatively joined to respective ones of the four slide valves 22,24 for rotating the pinions thereof and in turn controlling translation of the corresponding slide valves during operation. Each actuator is operatively joined to a main controller 30 of the screw compressor which controls all of its required operations. The controller 30 may have any conventional form such as a digitally programmable computer programmed in suitable software for sending required demand signals to each of the rotary actuators for positioning the slide valves as required for compressor operation.

Figure 3:
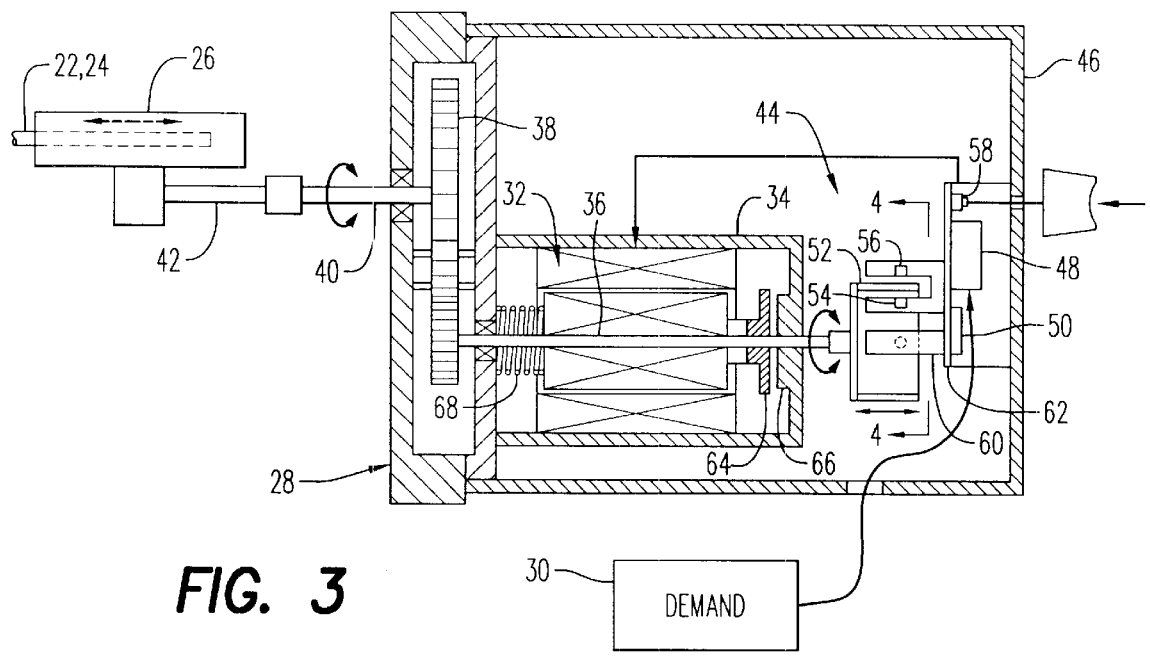
FIG. 3 is a partly sectional side elevational view of one of the several rotary actuators illustrated in FIG. 1 configured for driving corresponding control valves in accordance with an exemplary embodiment of the present invention.

The rotary actuator 28 is illustrated schematically in FIG. 3 in accordance with a preferred embodiment of the present invention. The actuator includes an electrical motor 32 suitably mounted in a structural frame 34, and includes a rotary motor shaft 36 having first and second opposite axial ends. The shaft supports an armature within a corresponding stator winding mounted in the frame for defining the motor which is suitably powered for rotating the shaft at any desired speed. For example, the motor 32 may be an alternating current (AC) motor with corresponding windings for forward and reverse rotary operation.

A gear train 38 is operatively joined to the first end of the motor shaft and includes a rotary output shaft 40 which projects outwardly from the actuator frame.

Each of the several rack-and-pinion gearboxes 26 includes a corresponding control shaft 42 fixedly joined to the pinion for rotation thereof. The output shaft 40 of each of the four actuators 28 is suitably fixedly coupled to the corresponding control shaft 42 of the respective gearbox for controlling operation of each of the four slide valves 22,24.

The electrical motor 32 and gear train 38 may have any conventional form for driving the respective compressor slide valves in a conventionally known manner. In accordance with the present invention, an optical encoder 44 is suitably mounted inside a protective housing 46 enclosing the rotary actuator, and is operatively joined to the motor shaft 36 for detecting rotation thereof during operation. A dedicated controller 48 for each actuator is also suitably mounted inside the housing 46 and is operatively joined to the encoder 44 and motor 32 for controlling operation thereof. The actuator controller 48 is preferably a digitally programmable microprocessor which may be programmed in software for controlling operation of the actuator.

In particular, the controller 48 is configured or programmed with suitable software for operating the motor 32 to rotate or drive the output shaft 40 between minimum and maximum rotary positions thereof as detected by the encoder. A particular advantage of the optical encoder is that it eliminates the need for a dedicated gearset joining the conventional potentiometer to the output shaft 40, and may be protected inside the housing 46 and operate with the motor shaft 36 irrespective of the number of rotations or turns thereof required during operation.

In the preferred embodiment illustrated in FIG. 3, the gear train 38 is configured for speed reduction from the motor shaft 36 to the output shaft 40. The gear train may have a minimum of two gears correspondingly joined to the two shafts 36,40, but typically includes many gears in the exemplary range of four to twenty for providing the required amount of reduction ratio in any conventional manner.

For example, the gear train 38 may include two gears connected to the shafts 36,40, and two more interconnected idler gears mounted by respective shafts inside the actuator frame for effecting a multitude of turns of the motor shaft 36 for each turn of the output shaft 40. In a typical application for driving the slide valves of the screw compressor, the gear train 38 preferably has a reduction ratio of 2000:1. This ratio requires 2000 turns of the motor shaft 36 for each turn of the output shaft 40.

As indicated above, a typical potentiometer has a limited rotary range of about 270 degrees. This makes its use impractical with the multi-turn motor shaft 36. And, when used with the output shaft 40 in a typical configuration, the potentiometer would require a corresponding reduction gearset to coordinate or calibrate the rotary range of the potentiometer over the required rotary range of the output shaft 40.

In the exemplary screw compressor application, one of the output shafts 40 requires a rotary range of about 506 degrees between the minimum and maximum rotary positions thereof. This 506 degree range is significantly greater than the typical 270 degree rotational capability of the rotary potentiometer, and requires a corresponding reduction gearset. In view of the reduction gear train 38, the required rotary range of the motor shaft 36 is 2000 times that of the output shaft 40 making impractical the use of the potentiometer with the motor.

By incorporating the optical encoder 44 inside the actuator housing 46, it is protected from the surrounding hostile environment of the screw compressor and enjoys significant additional advantages in cooperation with the motor shaft 36. For example, by detecting the rotation of the motor shaft 36, the reduction gear train 38 substantially increases the accuracy of detection of the rotary position of the output shaft 40 due to the substantial reduction ratio being used. One turn of the output shaft 40 requires 2000 turns of the motor shaft 36 which permits an accuracy of position of the output shaft 40 of at least one in two thousand, and even greater as described hereinbelow.

Disposed in cooperation with the actuator controller 48 illustrated in FIG. 3 is a digital memory 50 operatively joined thereto. The memory may have any conventional configuration, and the controller 48 is configured for operation therewith to store therein rotary counts generated by the encoder 44 corresponding with the minimum and maximum rotary positions of the output shaft. The rotary counts may correspond, for example, with individual rotations or turns of the motor shaft 36, or even portions thereof for even greater accuracy.

Figure 4:
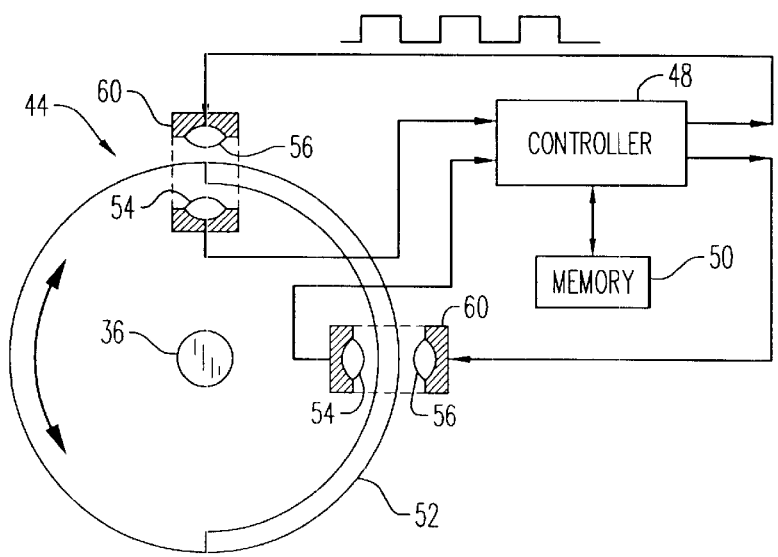
FIG. 4 is a partly sectional end view through the optical encoder illustrated in FIG. 3, and taken along line 4—4, with a cooperating controller illustrated schematically in accordance with an exemplary embodiment of the present invention.

The optical encoder 44 illustrated in FIGS. 3 and 4 includes a rotary photo-chopper or fence 52 fixedly joined to the second end of the motor shaft 36 opposite to the first end thereof joined to the gear train 38. The chopper 52 thusly rotates with the motor shaft during operation.

A pair of photodetectors 54 are fixedly mounted in the housing to adjoin the chopper for generating rotary counts in the form of electrical pulses as the chopper rotates with the motor shaft.

The optical encoder preferably also includes a pair of light emitters 56 disposed on one side of the chopper each in optical alignment with a corresponding one of the photodetectors disposed on the opposite side of the chopper. The light emitters 56 may have any conventional form such as light emitting diodes (LED), with the detectors also having any conventional form such as photodiodes or phototransistors.

As shown in FIG. 4, the chopper 52 is preferably in the form of a semi-cylinder or half-cup extending about 180 degrees around the perimeter of a flat supporting disk having a center aperture in which the distal end of the motor shaft may be fixedly joined. In this way, the photodetectors and emitters may be disposed in cooperating pairs to straddle the half-cup chopper 52 as it rotates with the motor shaft during operation.

The chopper thusly acts as a shutter which interrupts the corresponding optical paths between the emitters and detectors for 180 degrees per turn to produce a corresponding pulse signal for analysis by the controller 48. Since two pairs of the detector-emitters are used and are circumferentially spaced apart from each other, the rotary position, number of turns, and rotational direction of the motor shaft 36 may be determined by analysis of the pulse signals generated by the detectors 54. Clockwise rotation in FIG. 4 of the chopper 52 interrupts the detectors 54 in one sequence, and in an opposite sequence upon counterclockwise rotation of the chopper 52 which is detected by the controller.

Another advantage of the optical encoder 44 is the ability to quickly and easily calibrate operation of the rotary actuator, and correspondingly operate the actuator with high precision. In this regard, a normally open, push-button switch 58 is operatively joined to the controller 48, and the controller is further configured in software to calibrate the minimum and maximum rotary positions of the rotary counts generated by the encoder upon activating or engaging the switch in a calibration mode.

Figure 5:
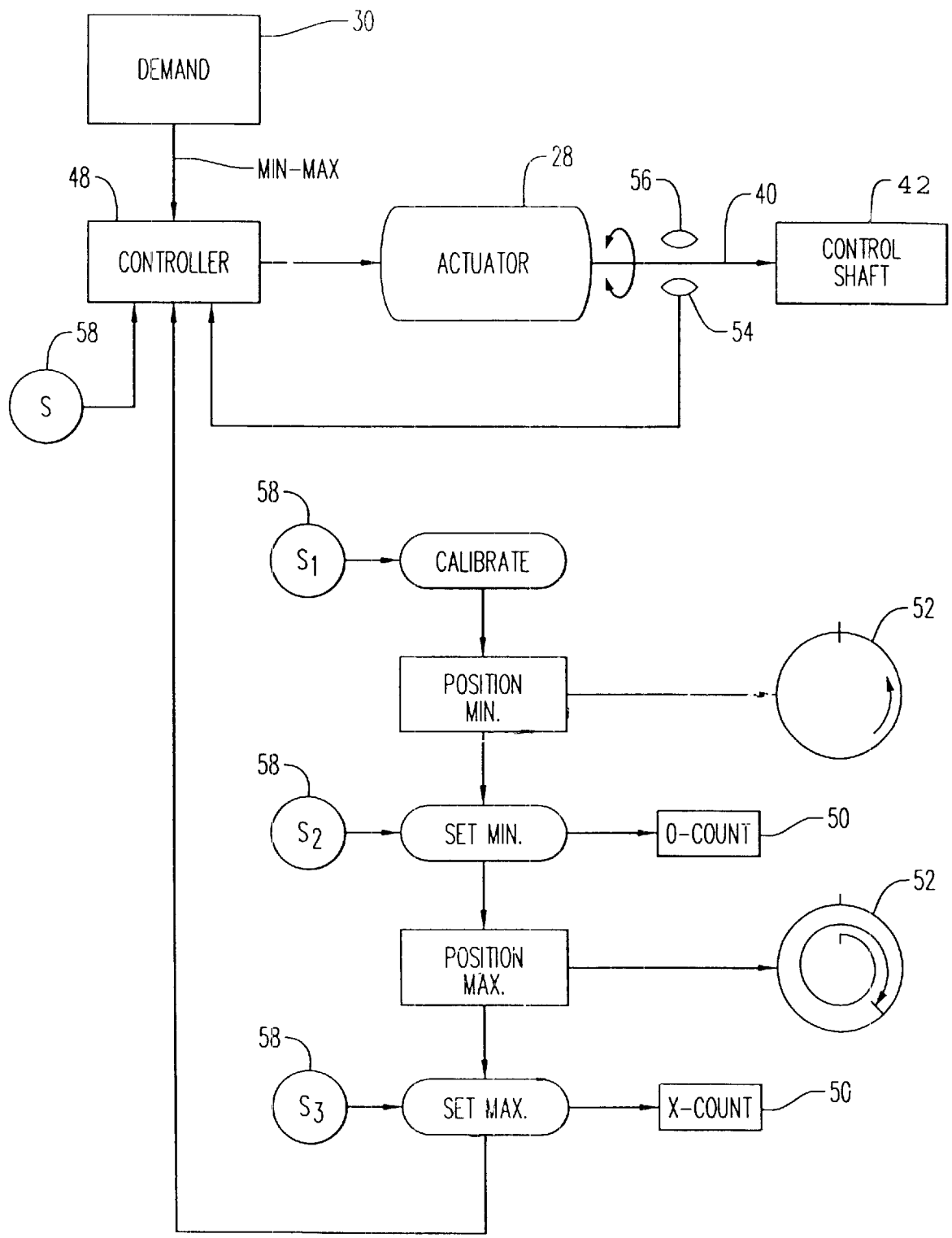
FIG. 5 is a schematic representation of the rotary actuator illustrated in FIGS. 1, 3, and 4 in conjunction with a flowchart representation of a method of calibrating and using the actuator in conjunction with the exemplary screw compressor.

A preferred method of using or calibrating the rotary actuator 28 is illustrated schematically in flowchart form in FIG. 5 in accordance with an exemplary embodiment. Calibration may be readily effected by firstly engaging or pushing closed the switch 58 to enter the calibration mode, and then operating the actuator motor to position the output shaft 40 to either one of the minimum and maximum rotary positions desired. For example, the motor may be operated to rotate the chopper 52 counterclockwise until the output shaft 40 is at the minimum rotary position thereof corresponding with the minimum axial translation position of the corresponding slide valve 22,24.

The same switch 58 is then re-engaged by being pushed a second time to set in the controller that the output shaft has been correspondingly rotated to one of the terminal positions such as the minimum position.

The actuator motor is again operated to re-position the output shaft to the other one of the minimum and maximum rotary positions, in this case the maximum position. In continuing with the example begun above, the output shaft 40 is rotated 506 degrees from its minimum rotary position to reach its maximum rotary position. Correspondingly, the chopper 52 must rotate 2000 times that 506 degree rotation of the output shaft to reach the corresponding maximum rotary position thereof.

The same switch 58 may then be re-engaged by being pushed a third time to set in the controller that the output shaft has been rotated to the other, or maximum, terminal position in the calibration mode, which mode is then automatically terminated for returning to normal operation of the actuator, now calibrated.

Calibration of the rotary actuator is substantially simpler than calibration of a mechanical potentiometer since the output shaft 40 illustrated in FIG. 3 may be coupled to the control shaft 42 initially in any relative position therewith. The rotary actuator is initially operated in its calibration mode to rotate the control shaft 42 to its desired minimum position at which position the corresponding position of the chopper is determined and made a reference position. Calibration is completed by operating the actuator to re-position the control shaft 42 to the desired maximum position thereof at which position the corresponding position of the chopper 52 is determined by the relative number of turns thereof compared with its reference position.

The corresponding minimum and maximum positions of the output shaft 40 are set in the controller by storing in the memory 50 the rotary counts from the encoder corresponding to the minimum and maximum positions, respectively. For example, at the set minimum position, a zero count may be stored in the memory. And, at the set maximum position the corresponding total number of counts (X) may also be stored in the memory.

In normal operation, the optical encoder may then be used for precisely determining the rotary position of the output shaft 40 as the counting increases from the minimum stored memory count or decreases from the maximum stored memory count in a precise and linear manner.

As shown in FIG. 5, the rotary actuator 28 is preferably operated in a conventional feedback loop. The compressor controller 30 initially provides a demand signal to the actuator controller 48 of the desired rotary position of the control shaft 42 at any point between its minimum and maximum range of travel. The actuator controller 48 is then used to drive the actuator motor and rotate the output shaft 40 in the proper rotary direction for achieving the demand rotary position.

In a simple analogy, the 506 degree range of travel of the output shaft 40 and the 2000:1 reduction ratio corresponds with a total range of turns or revolutions of the chopper of 2811. Accordingly, the position of the output shaft may be precisely controlled by controlling the rotary position of the chopper 52 to any rotary count between zero and 2811 representative of the minimum and maximum rotary positions thereof.

Since a pair of optical detectors is used, rotary direction of the chopper is readily determined so that the controlling rotary count may be increased or decreased by the controller depending upon the direction of rotation. Although the optical encoder may be used for also determining speed of rotation of the motor shaft, speed is not relevant in the present application since the actuator motor is typically operated at constant speed. However, shaft speed may be determined and used as desired in other applications.

As shown in FIG. 4, the light emitters 56 are operatively joined to the controller 48 which provides power thereto. The controller is preferably configured to power the emitters in a pulse mode of on and off light pulses. A train of light pulses may then be generated in each emitter, with each pulse having a light intensity substantially greater than the continuous power rating of the emitters. In this way, high intensity light pulses may be generated to penetrate any buildup of dirt or grime on either the emitters or detectors which may occur over extended use of the rotary actuators. Pulse mode operation of the emitters does not affect real-time response of the rotary actuator, yet enhances the reliability thereof without degrading the useful life of the emitters.

As illustrated in FIG. 3, each photodetector 54 and emitter 56 pair is preferably mounted in its own U-shaped block 60, of suitable plastic for example. Each block has two legs in which the detector and emitter may be molded in place in optical alignment with each other across the gap or groove therebetween.

The detector block 60 and controller 48 are preferably fixedly joined to a printed-circuit (PC) board 62, and the board is suitably fixedly mounted inside the actuator housing 46 for protection therein. The board is also mounted to position the two blocks 60 to each radially straddle the half-cup chopper 52 as shown in more detail in FIG. 4.

The two detector blocks 60 are preferably spaced 90 degrees apart from each other and cooperate with the 180 degree half-cup chopper 52 for providing quarter (¼) turn counts in the controller for enhanced accuracy of rotary position. The configuration of the two detector blocks illustrated in FIG. 4 results in four permutations of the detectors 54 being obstructed or unobstructed by the rotating chopper 52.

The two detectors 54 are both unobstructed from their corresponding emitters 56 when the chopper is outside the block grooves; or both obstructed when the chopper is in both grooves; or alternately obstructed or unobstructed depending upon which circumferential end of the chopper is disposed in the corresponding blocks. This configuration permits detection of the rotary position of the chopper 52 to a quarter turn accuracy, which correspondingly increases the number of rotary counts produced by the encoder four-fold.

In continuing with the example begun above, the 2811 turns of the chopper 52 corresponding with the minimum and maximum rotary positions of the output shaft 40 results in 11,244 rotary counts generated by the optical encoder over the exemplary minimum to maximum rotary range. Accordingly, the rotary position of the output shaft 40 may be controlled to a maximum precision of one in 11,244 counts where practical. This is a substantial improvement in accuracy over the mechanical potentiometer described above.

As shown in FIG. 3 a brake disk or rotor 64 is preferably fixedly joined to the motor shaft between the armature and the chopper for rotation therewith as the motor is driven. A cooperating brake disk or stator 66 is fixedly mounted in the motor frame 34 of the actuator coaxially with the brake rotor and closely adjacent thereto.

A compression spring 68 is suitably mounted at any convenient location such as surrounding the motor shaft between the armature and frame at the gear train to bias the brake rotor in axial abutment with the brake stator to provide braking friction force therebetween when the motor is not energized.

When the motor is supplied with electrical power, the magnetic coupling between the rotor armature and the stator winding separates the brake rotor from its stator and further compresses the spring for permitting unrestrained operation of the motor as it drives the output shaft 40. Interrupting electrical power to the motor terminates the magnetic coupling and permits the spring to engage the brake rotor with the stator for promptly stopping the motor for increasing accuracy of output shaft position.

As shown in FIG. 3, the bottoms of the grooves in the detector blocks 60 are axially spaced from the distal ends of the half-cup chopper to provide an axial gap therebetween to accommodate without rubbing axial translation of the motor shaft as the brake rotor engages the brake stator in friction. And, during operation of the motor the chopper is withdrawn slightly from inside the two detector blocks, with the cooperating detectors and emitters being centrally disposed axially along the chopper to ensure detection thereof as it rotates irrespective of axial position thereof.

As illustrated in FIG. 1, the rotary actuator 28 has particular utility in driving the several slide valves 22,24 of the screw compressor in its hostile environment. The screw compressor, its several slide valves, and controlling rack-and-pinion gearboxes 26 may have any conventional configuration. As shown in FIG. 3, the output shaft 40 of the rotary actuator may be coupled in any suitable manner to the corresponding control shaft 42 of any one of the slide valves of the screw compressor.

The actuator motor may then be operated to turn the control shaft between its minimum and maximum rotary positions in a calibration mode. The actuator is then readily calibrated to store in its memory the rotary counts corresponding with the minimum and maximum rotary positions of the control shaft.

As indicated above with respect to FIG. 5, actuator calibration is a simple push-button procedure which precisely calibrates the actuator for its limiting rotary positions irrespective of the rotary range required at the control shaft 42. That range may be less than or substantially greater than the typical range of a mechanical potentiometer which does not affect the configuration of the actuator which is generic to an unlimited rotary range of operation.

A particular advantage of the generic rotary actuator is that identical rotary actuators may be used for different applications such as the different rotary ranges required for the screw compressor illustrated in FIG. 1. The two slide valves 22,24 typically require different ranges of min-max axial travel during operation, and correspondingly the driving pinions therefor have different ranges of minimum and maximum rotary positions.

Accordingly, identical first and second rotary actuators 28 are coupled independently to respective ones of the first and second control shafts 42 corresponding with the different slide valves 22,24.

The two rotary actuators for each valve pair are then calibrated by operating the motors thereof to turn the corresponding first and second control shafts over different ranges of the minimum and maximum rotary positions required therefor.

The simple push-button calibration procedure shown in FIG. 5 is followed for each of the rotary actuators to store in the respective memories thereof different rotary counts corresponding with the different ranges of rotary positions required for the different slide valves 22,24. Since the screw compressor illustrated in FIG. 1 has two sets of slide valve pairs, four rotary actuators are required, and identical actuators may be used with each being simply pushed-button calibrated for precisely controlling operation of the corresponding slide valves.

During normal operation of the screw compressor, the main controller 30 thereof issues corresponding demand signals to each of the four rotary actuators. The precise rotary position of each of the choppers in the respective rotary actuators is maintained in the respective memories thereof and adjusted as the motor shafts are rotated clockwise or counterclockwise over the range of required minimum and maximum rotary positions of the corresponding output shafts.

Conventional feedback control is used to detect the actual rotary position of the corresponding choppers and drive the actuators until the demanded rotary position is achieved. Feedback control may be effected in the individual controllers 48 of the actuators, or in the main controller 30 of the screw compressor. The main controller may be configured in a conventional manner for distributed control cooperating with the individual actuator controllers. Control of the actuators may be effected locally in each controller thereof, or centrally in the main controller 30 using feedback from the corresponding optical encoders.

The rotary counts are initially generated from the photodetectors 54 by the corresponding electrical pulses therefrom as the chopper fence sequentially interrupts the light beams between the emitters and the detectors. The rotary counts may have any suitable form such as count integers, or may be converted to ranges of electrical voltage of about zero to about five volts DC for example, or a range of electrical current from about four to about twenty milliamps for example.

The rotary count, voltage, or current ranges may be used in either the actuator controller 48 or the compressor controller 30 for feedback control operation thereof to precisely position the corresponding output shafts 40 of each of the actuators within the desired min-max rotary ranges thereof to correspondingly position the slide valves as required within their position ranges.

The rotary actuator described above enjoys significant precision of control of its rotary output shaft, and may be used in any application requiring precise control of a rotary shaft to which the output shaft may be coupled. The reduction gear train 38 ensures that the chopper 52 experiences more rotations than that of the output shaft 40 and therefore permits precise rotary positional control of the output shaft within fractions of a complete revolution.

However, the gear train 38 need not be a reduction gear train, but may have any other configuration as desired with its output shaft being controlled in position by the cooperating optical encoder.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A rotary actuator for driving an external shaft, comprising:
    a motor having an integral motor shaft including first and second opposite ends;
    a gear train operatively joined to said first end of said motor shaft and having a rotary output shaft for driving said external shaft;
    an optical encoder operatively joined to said motor shaft for detecting rotation thereof; and
    a controller operatively joined to said encoder and motor, and configured for operating said motor to drive said output shaft in opposite directions between minimum and maximum rotary positions thereof as detected by said encoder.

2. An actuator according to claim 1 further comprising a memory operatively joined to said controller, and said controller is further configured to store in said memory rotary counts generated by said encoder corresponding with said minimum and maximum rotary positions.

3. A rotary actuator comprising:
    a motor having a motor shaft including first and second opposite ends;
    a gear train operatively joined to said first end of said motor shaft and having a rotary output shaft;
    an optical encoder operatively joined to said motor shaft for detecting rotation thereof;
    a controller operatively joined to said encoder and motor, and configured for operating said motor to drive said output shaft between minimum and maximum rotary positions thereof as detected by said encoder;
    a memory operatively joined to said controller, and said controller is further configured to store in said memory rotary counts generated by said encoder corresponding with said minimum and maximum rotary positions; and
    a switch operatively joined to said controller, and said controller is further configured to calibrate said minimum and maximum rotary positions with said counts generated by said encoder upon engaging said switch.

4. A method of calibrating said actuator according to claim 3 comprising:
    engaging said switch, and operating said motor to position said output shaft to one of said minimum and maximum rotary positions;
    re-engaging said switch to set in said controller that said output shaft has been rotated to said one position;
    operating said motor to reposition said output shaft to the other one of said minimum and maximum rotary positions; and
    re-engaging said switch to set in said controller that said output shaft has been rotated to said other position.

5. A method according to claim 4 wherein said minimum and maximum positions are set in said controller by storing in said memory rotary counts from said encoder corresponding to said minimum and maximum positions, respectively.

6. An actuator according to claim 3 wherein said optical encoder comprises:
    a rotary chopper fixedly joined to said motor shaft for rotation therewith; and
    a pair of photodetectors adjoining said chopper for generating said rotary counts as said chopper rotates with said shaft, and operatively joined to said controller for detecting rotary position and direction of said chopper.

7. An actuator according to claim 6 wherein said optical encoder further comprises a pair of light emitters disposed on one side of said chopper in optical alignment with corresponding ones of said photodetectors disposed on an opposite side of said chopper.

8. An actuator according to claim 7 wherein said light emitters are operatively joined to said controller, and said controller is further configured to power said emitters in a pulse mode with a train of light pulses each having an intensity greater than a continuous power rating of said emitters.

9. An actuator according to claim 6 wherein:
    said chopper comprises a half-cup coaxially extending from said second end of said motor shaft; and
    said photodetectors and emitters are disposed in cooperating pairs at about 90 degrees apart for generating quarter-turn counts in said controller.

10. An actuator according to claim 9 wherein:
    said photodetector and emitter pairs are each mounted in a U-shaped block;
    said detector blocks and controller are fixedly joined to a printed-circuit board; and
    said board is fixedly mounted in said actuator to position said blocks to radially straddle said half-cup chopper.

11. An actuator according to claim 10 further comprising:
    a brake rotor fixedly joined to said motor shaft for rotation therewith;
    a brake stator fixedly mounted in said actuator coaxially with said brake rotor;
    a spring surrounding said motor shaft to bias said brake rotor in axial abutment with said brake stator; and said detector blocks are axially spaced from the distal end of said half-cup chopper to provide a gap therebetween to accommodate axial translation of said motor shaft as said brake rotor engages said brake stator in friction.

12. An actuator according to claim 3 wherein said gear train is configured for reduction from said motor shaft to said output shaft.

13. An actuator according to claim 12 wherein said gear reduction train is configured to require rotation of said motor shaft greater than the rotational capability of a rotary potentiometer for positioning said output shaft between said minimum and maximum rotary positions.

14. An actuator according to claim 12 wherein said gear reduction train is configured for a multitude of turns of said motor shaft for each turn of said output shaft.

15. A method of using said rotary actuator according to claim 3 comprising:

coupling said output shaft to a control shaft of a screw compressor;

operating said motor to turn said control shaft between minimum and maximum rotary positions thereof; and calibrating said actuator to store in said memory said rotary counts corresponding with said minimum and maximum rotary positions of said control shaft.

16. A method of using said rotary actuator according to claim 3 further comprising:

coupling first and second ones of said rotary actuator independently to respective first and second control shafts of a screw compressor;

operating said motors in each of said actuators to turn said first and second control shafts over different ranges of said minimum and maximum rotary positions; and calibrating said first and second actuators to store in said memories thereof different rotary counts corresponding with said different ranges of rotary positions.

17. A method according to claim 16 further comprising operating said first and second actuators to turn said first and second control shafts, respectively, and drive corresponding rack-and-pinion gearboxes controlling translation of a capacity control slide valve and a volume ratio control slide valve of said screw compressor.

18. An actuator comprising:

a motor having a motor shaft including first and second opposite ends;

a gear train operatively joined to said first end of said motor shaft and having a rotary output shaft;

an optical encoder operatively joined to said motor shaft for detecting rotation thereof, and including a rotary chopper fixedly joined to said motor shaft for rotation therewith, and a pair of photodetectors adjoining said chopper for detecting rotary position and direction of said chopper; and a controller operatively joined to said photodetectors and motor, and configured for operating said motor to drive said output shaft between minimum and maximum rotary positions thereof as detected by said encoder.

19. An actuator according to claim 18 further comprising:

a memory operatively joined to said controller, and said controller is further configured to store in said memory rotary counts generated by said encoder corresponding with said minimum and maximum rotary positions; and a switch operatively joined to said controller, and said controller is further configured to calibrate said minimum and maximum rotary positions with said counts generated by said encoder upon engaging said switch.

20. An actuator according to claim 19 wherein:

said optical encoder further comprises a pair of light emitters disposed on one side of said chopper in optical alignment with corresponding ones of said photodetectors disposed on an opposite side of said chopper;

said chopper comprises a half-cup coaxially extending from said second end of said motor shaft;

said photodetectors and emitters are disposed in cooperating pairs at about 90 degrees apart for generating quarter-turn counts in said controller; and said gear train is configured for reduction from said motor shaft to said output shaft.

* * * * *